United States Patent [19]
Harkness

[11] 3,914,368
[45] Oct. 21, 1975

[54] METHOD OF MAKING METAL REINFORCED PLASTIC SCREEN

[75] Inventor: Richard Ernest Harkness, Hudson, Ohio

[73] Assignee: Combustion Engineering, Inc., Windsor, Conn.

[22] Filed: Apr. 24, 1974

[21] Appl. No.: 463,705

[52] U.S. Cl. ................. 264/219; 264/274; 264/299
[51] Int. Cl.² ............................................ B29D 3/02
[58] Field of Search .......... 264/219, 213, 214, 254, 264/255, 259, 271, 273, 274, 275, 299, DIG. 20, 257, 334, 261, 277, 278; 161/DIG. 6; 249/110, 117, 93, 123, 176

[56] References Cited
UNITED STATES PATENTS

| | | | |
|---|---|---|---|
| 418,840 | 1/1890 | Hettich | 264/261 |
| 2,289,339 | 7/1942 | Brennan | 264/DIG. 20 |
| 2,364,036 | 11/1944 | Mackay et al. | 264/299 |
| 2,544,602 | 3/1951 | Kosorotoff | 249/176 |
| 2,710,904 | 2/1955 | Roensch | 264/274 |
| 2,780,946 | 2/1957 | McGuire | 264/299 |
| 2,903,388 | 9/1959 | Jonke et al. | 264/271 |
| 3,012,284 | 12/1961 | Touhey | 249/142 |
| 3,290,421 | 12/1966 | Miller | 264/219 |
| 3,454,168 | 7/1969 | Cahn | 161/DIG. 6 |

*Primary Examiner*—Robert F. White
*Assistant Examiner*—Willard E. Hoag
*Attorney, Agent, or Firm*—Robert L. Olson

[57] ABSTRACT

A method of making plastic screen where a plurality of pegs are vertically positioned within an open topped mold by passing a peg through each opening of a positioning screen member located above the mold, and a castable liquid plastic is then poured into the mold. The bottom ends of the pegs are tapered, so that the holes or openings in the finished plastic screen are flared. Metal reinforced plastic screen is made in the same manner, only a peg is positioned within each opening of a metal screen, whose openings are the same size as, and are in alignment with, the openings of the positioning screen member, the metal screen being positioned closely adjacent the mold bottom or base, and the liquid plastic is poured into the mold to a height above the metal screen. The pegs are smaller than the metal screen openings, so that no metal is exposed in the finished article.

6 Claims, 5 Drawing Figures

METHOD OF MAKING METAL REINFORCED PLASTIC SCREEN

BACKGROUND OF THE INVENTION

A common means of separating different sized materials today is by use of a vibrating metal screen, perforated metal plate, or rubber-covered perforated plate. Although the vibration of the screen results in greatly increased efficiency and capacity, the abrasive action of the particles being separated also causes the screen deck to wear rapidly, necessitating frequent shutdown and replacement. Many plastics, such as polyurethane, are much more abrasive resistant than metal screens, perforated plate, rubber or a combination thereof.

SUMMARY OF THE INVENTION

In accordance with the invention, a method is provided by which plastic screen, and metal reinforced plastic screen, can be economically and easily fabricated by a casting process which requires no expensive mold.

DESCRIPTION OF THE PREFERRED EMBODIMENT

Figure 1:
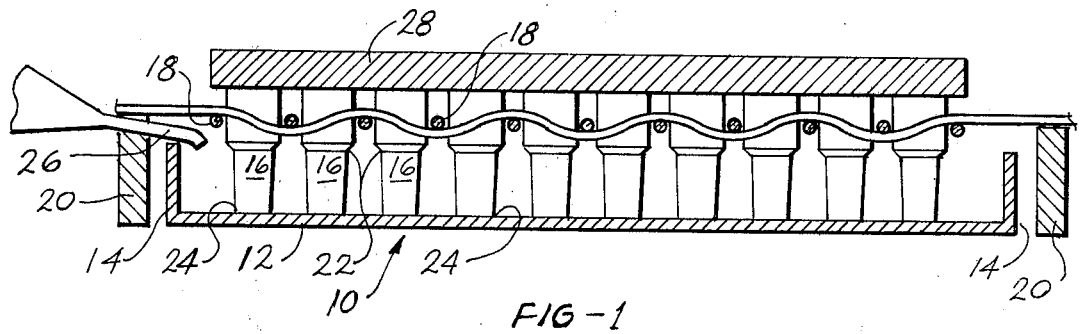
FIG. 1 shows a mold with a plurality of pegs or cores in place, which can be used for casting plastic screen.

Looking now to FIG. 1, numeral 10 designates an open topped mold in which plastic screen can be cast. The mold consists of a base 12, and upstanding side walls 14. Positioned within the mold are a plurality of pegs or cores 16, which can be iron, wood, or any other suitable material. A screen 18 located above the mold 10 is used for supporting and aligning the upper ends of the pegs 16, thus maintaining them in vertical upright position. The screen 18 is attached to and supported at each of its four corners by posts 20.

The lower portion of each peg 16 is tapered, the taper starting at a point 22 and continuing down to the bottom end 24 of each peg. The pegs are in contact at their bottom ends with the base 12, and weight 28 positioned on top of the pegs 16 assures good physical contact between the pegs and the mold base. Castable liquid plastic, such as polyurethane, can be introduced into the mold 10 through spout 26. The liquid plastic 30 flows over the entire area of the mold, thus forming a plastic sheet when it hardens, with openings therethrough at the location of the pegs. The viscosity and curing time of the liquid plastic used should be such that the entire sheet of finished plastic is of even thickness. The liquid plastic can be poured hot or cold into the mold, depending on the type of plastic and its curing or hardening characteristics.

Figure 2:
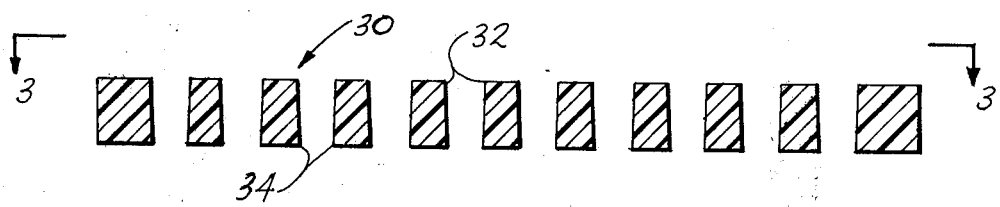
FIG. 2 is a sectional side view of the finished plastic screen.
Figure 3:
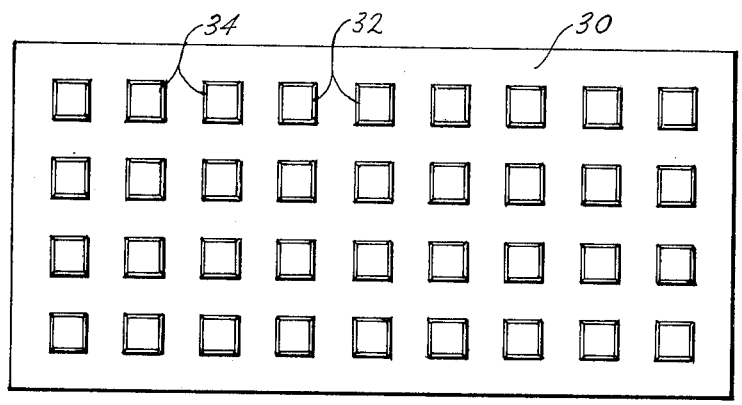
FIG. 3 is a view taken on lines 3—3 of FIG. 2.

FIGS. 2 and 3 indicate a finished plastic screen 30, after it has been removed from the mold and the pegs have been removed. The pegs are coated with a mold releasing agent so they can be easily removed, and reused. As can be seen in FIGS. 2 and 3, the holes or openings are larger at the upper edge 32 than at the bottom 34. When the screen is used in a sifting operation it is turned over, so the side where the openings are smallest determine the particle size passing through in a sifting operation. Any particle passing through the small side of the opening will readily fall through and not become wedged within the hole or opening. The finished plastic screen can be of varied thickness, such as one-fourth inch on up to 1 inch or greater, depending on the size of the holes in the screen and the coarseness of the material that is going to be sifted therethrough. It is possible to make the hole sizes in the screen as small as one-eighth inch on a side, or as large as 1 inch or greater, by this casting process. A typical overall size of the finished screen would be 4 feet square or larger, so as to fit any standard size sifting machine in use today.

Figure 4:
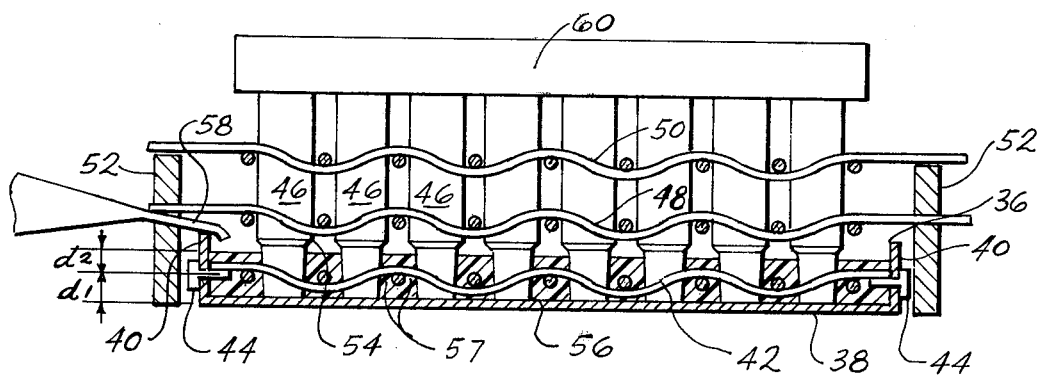
FIG. 4 shows the apparatus used to make metal reinforced plastic screen.

Looking now to FIG. 4, apparatus is shown for casting metal reinforced plastic screen. An open topped mold 36 having a base 38 and sidewalls 40 is used. A metal screen 42 is positioned within the mond parallel to and closely adjacent to the base 38. A few of the wires forming the screen 42 are attached to the ends of bolts 44 along all four sides. The bolts coact with threaded openings in the sidewalls 40, so that the screen 42 can be properly positioned, and tensioned if desired. The bolts 44 are threaded out before the finished reinforced plastic screen is removed from the mold, so they do not interfere with the removal. This also breaks the wires of the screen 42 loose from the bolts. A plurality of pegs 46, coated with a mold releasing agent, are positioned within the mold. The pegs are placed so that one passes through each opening in the screen 42. The pegs 46 are held in their upright, vertical position by two screens 48 and 50. These screens should have the same number of openings as the screen 42, and should be properly aligned, so that the bottom portion of the pegs are centered in the holes in screen 42. This assures a plastic coating on all of the metal wire of screen 42. Both screens 48 and 50 are adjustably attached to posts 52 positioned in each of the four corners, so the screens can be properly supported and aligned with respect to screen 42.

As is the case in the FIG. 1 configuration, the bottom portions of the pegs 46 are tapered from a point 54 to their bottom ends 56, which are seated on the mold base 38. A weight 60 provides a downward force on pegs 46 to insure good physical contact between the bottom of the pegs and base 38. A pouring spout 58 is used to introduce liquid plastic into the mold 38. The plastic is poured to a depth such that the distance $d^1$ below the screen 42 is equal to the distance $d^2$, thus centering the metal reinforcing screen 42 within the finished product. The annular spaces 57 surrounding pegs 46 permits a good layer of plastic to be formed adjacent the walls of the holes in the finished screen. This is why two positioning screens 48 and 50 are used to insure perfect vertical position of the pegs 46. If some of the pegs 46 were skewed to the vertical so as to be touching the wire of screen 42 on one side, no plastic layer would be formed on this wire. Depending on the size of the pegs used, it may be possible to properly align the pegs with use of only one screen instead of two. The larger the peg size, the more feasible use of only one positioning screen becomes.

Figure 5:
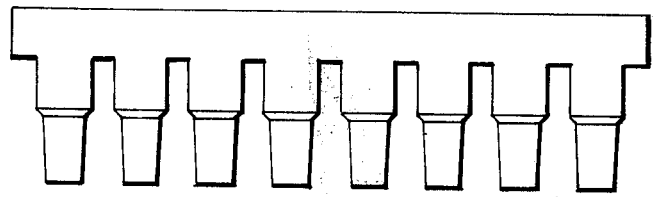
FIG. 5 shows an alternate peg or core arrangement which can be used.

It would also be possible to secure a number of pegs together, thus eliminating the need for positioning screens. FIG. 5 shows such an arrangement. These could be formed in integral one foot square sections, or even larger if desired. This arrangement would be commercially feasible where a great quantity of the same sized screens are made, having the same sized openings in the screens. Where a great variety of screen sizes, along with a number of variations of hole size openings therein are fabricated, it is more economical to use the apparatus of FIGS. 1 and 4.

What is claimed is:

1. A method of making metal reinforced plastic screen including the steps of forming an open topped mold having a base and upwardly extending peripheral walls, positioning a metal screen within the mold in a position parallel to the base, and spaced a small distance thereabove, positioning at least one screen member above the mold, the screen member and the metal screen having openings of the same size, with the openings of the screen member being in alignment with the openings of the metal screen positioning a peg vertically within each of the openings of the screen member and a corresponding opening of the metal screen, each peg having different top and bottom cross-section areas and all pegs being alike in size and shape, upper portions of said pegs being positioned by said screen member and lower portions of said pegs being out of contact with said metal screen, and holding said pegs in contact with said base while pouring a hardenable plastic material in said mold to a predetermined height above said metal screen, allowing said plastic to harden, removing the pegs from the plastic and removing said plastic and metal screen from said mold.

2. The method of claim 1, including the step of coating the pegs with a mold releasing agent prior to their being positioned within the mold.

3. The method of claim 1, including the step of applying a downward force to the pegs, to insure that they are in good physical contact with the base prior to, during, and after the pouring of the plastic into the mold.

4. The method of claim 1, wherein the predetermined height above the metal screen is the same distance as the distance from the metal reinforced plastic screen to the base, so that the metal screen is centered in the final metal reinforced plastic screen.

5. The method set forth in claim 1, wherein the pegs are tapered at their bottom ends, the cross section of the pegs being smallest at their bottom end, so that the holes in the finished metal reinforced plastic screen are flared from one side to the other.

6. The method set forth in claim 1, wherein two screen members are positioned above the mold, one above the other, their openings being of equal size and in alignment.

* * * * *